United States Patent [19]

Goodwin et al.

[11] Patent Number: 4,950,460
[45] Date of Patent: Aug. 21, 1990

[54] GAS GENERATING DEVICE

[75] Inventors: John C. Goodwin; Roy Kirby; Philip S. Simons, all of Middlesex; Andrew J. Carter, Essex, all of England

[73] Assignee: Dowty Maritime Systems Limited, Middlesex, England

[21] Appl. No.: 252,134

[22] Filed: Oct. 3, 1988

[30] Foreign Application Priority Data

Oct. 1, 1987 [GB] United Kingdom ............... 8723034

[51] Int. Cl.$^5$ .............................................. B01J 7/02
[52] U.S. Cl. ....................................... 422/239; 48/61; 423/657
[58] Field of Search ............................... 48/61, 24, 36; 423/645–647, 657; 422/238, 239, 242, 310

[56] References Cited

U.S. PATENT DOCUMENTS

| | | | |
|---|---|---|---|
| 1,481,943 | 1/1924 | Wade | 48/24 |
| 2,334,211 | 11/1943 | Miller | 48/61 |
| 2,516,934 | 8/1950 | Weaver | 48/61 |
| 2,721,789 | 10/1955 | Gill | 48/61 |
| 3,222,122 | 12/1965 | Johnson | 423/657 |
| 3,323,873 | 6/1967 | Horn et al. | 423/657 |
| 3,540,485 | 11/1970 | Kummins | 423/657 |
| 3,919,405 | 11/1975 | Lenz et al. | 423/646 |
| 4,155,712 | 5/1979 | Taschek | 422/239 |

Primary Examiner—Joye L. Woodard
Attorney, Agent, or Firm—Young & Thompson

[57] ABSTRACT

A gas generating device which comprises a container within which is sealed a gas generator in the form of a water-reactive substance and structure is provided to break the seal in situ and allow water to penetrate the container and react with the substance to produce the gas. The water-reactive substance may be in the form of pellets having the same or different reactivity with water arranged in the container so as to produce the gas at uniform or varying rates of production.

22 Claims, 4 Drawing Sheets

GAS GENERATING DEVICE

FIELD OF THE INVENTION

This invention relates to water reactive gas generators and, more particularly, to gas generating devices which, because of their construction, have a long shelf life but can be used immediately a need arises.

SUMMARY OF THE INVENTION

In accordance with the invention, there is provided a gas generating device which comprises a container within which is sealed a gas generator in the form of a water-reactive substance and means are provided to break the seal in situ and allow water to penetrate the container and react with the substance to produce the gas.

The container can be any suitable shape or size and made from any relevant material. Typically, it can be cylindrical and made from a metal which does not corrode in water, for example aluminium or an aluminium alloy.

To prevent premature generation of gas, the water-reactive substance must be completely sealed within the container prior to use. However, the container must be able to allow water penetration immediately upon a given signal or operation.

In a preferred embodiment of the invention, the container possesses one or more sealing discs in its surface which prior to use of the device maintain the container in a water-tight mode but which can be removed or dislodged to allow water penetration when desired. The means of removal can be, for example, an explosive charge detonated by external operation which forces a bolt against the disc and thereby forceably removes it or causes it to shatter; in the latter case, either glass discs or bursting discs can conveniently be employed.

There will generally be a need to have two discs, one for the ingress of water and the other for the egress of generated gas. In the case of a cylindrical canister, therefore, the first can be positioned at the (in use) normal lower end of the canister and the second at the normal upper end respectively.

In such cases, a preferred device has spool valve closures in which discs positioned at either end of a container are linked by a stem or thrust rod so that removal of a first disc by explosive charges (or whatever) automatically causes a second disc to be displaced.

It is also preferred for the discs, once they have been displaced, to be incapable of resealing the container due to, for example, water pressure causing their return to their original position in the container wall. This can be achieved by means of a lock spring attached to the disc and, in a sealing position, elastically deformed against a relevant part of the container or an extension thereof but, on removal of the seal, springing to its natural shape and thereby preventing the seal being re-seated in its sealing position.

In the case of a spool valve closure, such a lock spring can pivotally be mounted on the normal upper seal adjacent or near that part of the rod attached to the seal so as to prevent reseating of either seal of the spool valve system.

The gas generator may be any water-reactive substance which produces a gas when in contact with water. Usually, copious amounts of gas are required and hydrides are preferred as a general class of useful substances, producing hydrogen gas in contact with water.

In general any suitable hydride could be used including those of lithium, sodium, potassium, aluminium, calcium and magnesium and also mixed hydrides, especially those containing aluminium. Lithium hydride or lithium aluminium hydride are preferred in the present invention.

The devices of the invention are capable of having a long shelf life and, once operated, of allowing an instantaneous ingress of water to the interior of the container. Thereafter, however, the rate of evolution of gas can be varied in a predetermined manner. For example, there is a wide choice of gas generators per se and, in addition, the physical characteristics of any particular gas generator, such as its extent of compaction or density per unit volume, may be varied from device to device or even varied within different regions of a single device. Equally, inhibitors or accelerators may be added to the gas generator to determine the rate at which water comes into contact with the generator and/or the rate of reaction once it does come into contact.

In a preferred embodiment to cause a fast rate of gas generation, the canister contains a generator comprising substantially pure lithium hydride or lithium aluminium hydride granules.

In a preferred embodiment to cause a slower rate of gas generation, the canister contains a generator comprising substantially pure lithium hydride or lithium aluminium hydride granules admixed with a filler material such as wax, for example paraffin wax, water soluble salts, for example sodium chloride, greases, oils and soft rubbers, for example butyl rubber or mixtures thereof. The generator may also optionally contain either aluminium particles or a lithium-aluminium alloy in granular form, for example one containing 20% lithium and 80% aluminium by weight, to moderate the reactivity of the generator with water.

A generator which has been found to be particularly useful contains lithium hydride granules, paraffin wax and a lithium-aluminium alloy, for example 50% lithium hydride granules, 40% paraffin wax and 10% lithium-aluminium alloy (20%/80%) in granular form, all by weight.

In certain cases it may be important to ensure that the gas generator (whether it is one to cause a fast rate of gas generation or a slow rate of gas generation) produces gas in a controllable, uniform manner. In such cases in particular, it is preferred that the generator itself does not comprise a single charge of gas generating substance but rather comprises a number of individual components arranged so that, in use, water can penetrate between the components and consume the components simultaneously.

Most preferably, means are provided in such generators to hold the individual components in a predetermined manner relative to each other so that during consumption they do not move within the canister holding the generator. This can be achieved by packing the generator components in layers and separating the layers by water permeable barriers, for example sheets (or whatever) of mesh.

The use of individual components for the generator, especially separated by water permeable barriers so that they cannot move within the canister, also allows water penetrating the canister to contact the entire surface of each component. This can be important not only in achieving uniform gas generation in general but also in controlling the temperature throughout the generator.

The rate of gas evolution generally depends on the surface area of gas generator substance exposed to water in use. To obtain a substantially constant rate of evolution, it is therefore important to ensure that this area remains constant. This is preferably achieved in the invention by masking part of the generator substance with a water impervious outer layer; for example, in the case of a cylindrical generator (or a series of cylindrical components) the curved circumferential surface may be masked whilst leaving one or both flat ends unmasked and exposed to the water.

Generators providing a varied rate of gas generation can also be used in the devices of the invention. This can be achieved by having a generator with two or more individual "charges" of different compositions which, in use, can be consumed by water entering the device at different rates either simultaneously or consecutively. For example, the canister may contain an outer shell of a first generator composition within which is contained a second composition. In the case of a cylindrical canister having sealing discs in the centre of each end, the outer shell may also be cylindrical so that water entering the canister first encounters the generator composition positioned within the inner shell; if that inner composition is more reactive with water than the outer composition, then the inner generator clearly will be consumed first.

Furthermore, physical barriers may be used to ensure consumption of the first generator composition before the second (or subsequent) compositions contact the water. This can be achieved by partially wrapping one or more of the individual compositions with, for example, a heat shrinkable plastic material or metal foil.

Generator compositions per se in the form of shaped, compressed water-reactive compositions are also included in the scope of this invention.

With regard to the gas generator substance, it is important (except in the case of a single component system) that the ingredients are well mixed to ensure a uniform distribution throughout the substance; this applies particularly to the hydride or other gas generating ingredient.

The grain size of the ingredients, particularly of the gas generating ingredient such as lithium hydride, is important in that it affects the rate of consumption of the substances by the water. Generally, it has been found that the smaller the grain size, the greater is the rate of consumption.

Lithium hydride is a preferred gas generating ingredient (or substance in its own right) and, with a grain size of, say, 30 mesh can be pressed to form a pellet. Mixtures of lithium hydride, paraffin wax and a lithium-aluminium alloy, in particular the specific one referred to above, can also be relatively ready pressed to form a pellet.

Because of the nature of the materials, i.e. their reactivity with water in particular, it is essential for all the processing to be carried out in dry conditions, preferably in the presence of a purging inert gas atmosphere such as argon to prevent contamination during mixing. If wax or similar substance is present, the mixing temperature should be above its melting point (but not at the boiling point).

Thereafter pressing of the mixed substance should also be effected in dry conditions and again preferably in the presence of an inert gas. The pressing pressure can be important. If it is too low, the pressed pellets tend to fragment and break, causing erratic performance and short life. If it is too high, the resultant compaction can retard the reaction rate with water and it can be difficult to remove the pressed pellets from the mould.

Finally, the packing of the generator into the container should also be effected under dry, inert atmosphere conditions.

The devices of the invention have many varied uses including buoyancy bags for underwater lifting and salvage purposes, for pressurising inflatable objects underwater or otherwise and emergency gas supplies for balloon inflation, etc.

For many of these uses, the generated gas will escape the container via an aperture formed when the sealing disc (or whatever) is removed and this aperture may be suitably fitted with means to direct the gas into a container or other chosen vessel depending on the use to which the gas is to be put.

BRIEF DESCRIPTION OF THE DRAWINGS

For better understanding of the invention, reference is now made, by way of exemplification only, to the accompanying drawings in which.

DESCRIPTION OF THE PREFERRED EMBODIMENTS

Figure 1:
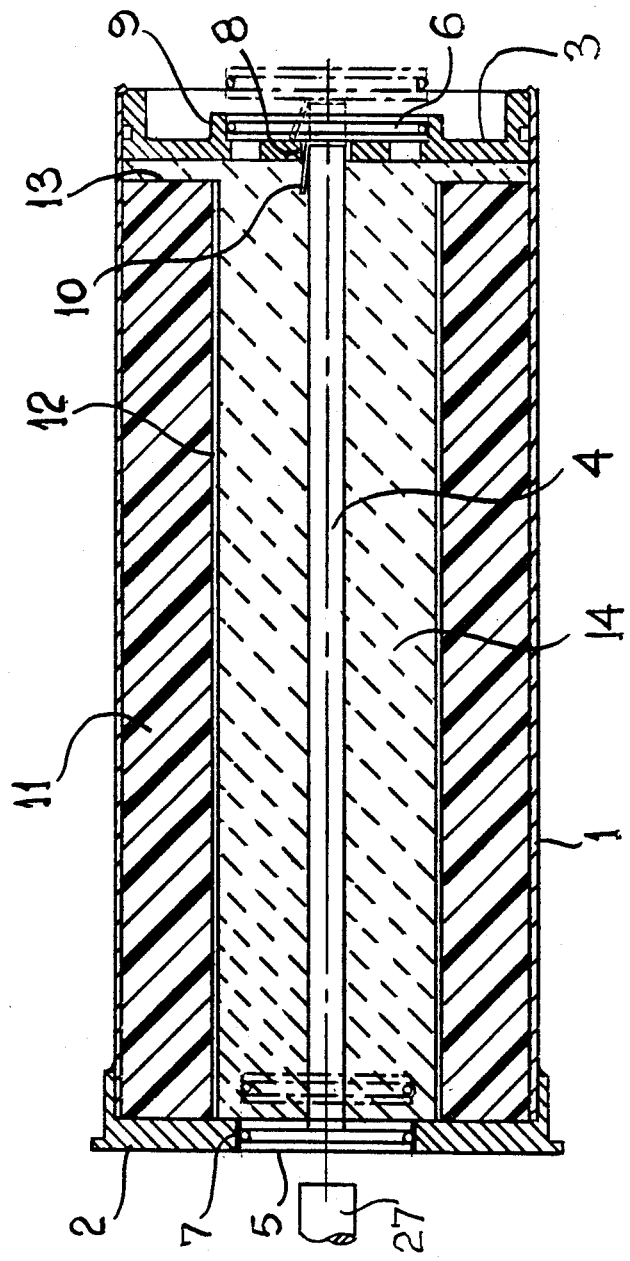
FIG. 1 is a sectional view through a first gas generating device of the invention.

With reference to the drawings, FIG. 1 shows a gas generating device comprising a cylindrical container 1 having two end plates 2, 3 bonded thereto and a spool valve having a central thrust rod stem 4; at either end of the stem 4 are rigidly attached discs 5, 6, both of which having an "0" ring contained in an annular groove in its curved surface.

The end plate 2 has a relatively large circular aperture 7 whereas the end plate 3 has a smaller aperture 8. In addition, the end plate 3 has an annular flange 9 defining a circular recess in the outer surface of the end plate about the aperture 8.

The device is constructed so that the stem 4 passes through the aperture 8 and in the manufactured state, i.e. before use, the spool valve is positioned so that discs 5 and 6 are sealingly contained within aperture 7 and flange 9 respectively. The spool valve is maintained in this position through force fitting aided in particular by a lock spring 10 mounted in the stem 4 adjacent the disc 6. The spring 10 comprises a ring portion for placing about the stem 4 and a rectangular portion depending from the ring portion. The rectangular portion normally lies proud of the surface of the stem but in position in the aperture 8 is elastically deformed and thereby aids the force fit.

When it is desired to trigger the device and generate gas, a bolt 27 is caused to impinge on the outer surface of the disc 5 by explosive (or whatever) means and thereby dislodge the disc 5 from its aperture 7. Disc 6 is simultaneously displaced from its flange 9 by the stem 4, thereby opening aperture 8 also. When this has been effected, the rectangular portion of the lock spring 10 is also displaced from aperture 8 and, because of the elasticity of the spring, does not allow the disc 6 (or therefore disc 5) to re-seal the aperture.

The interior of body 1 contains a gas generator. In the embodiment shown in FIG. 1; this comprises an outer cylindrical component 11 having a physical, water impermeable separator 12 on its inner face (and optionally on its outer face) and therefore presenting only one surface 13 to water entering the container; a separate component 14 is contained within the cylinder 11.

In use of the device, therefore, water entering through the aperture 7 on removal of the disc 5 will react first with the (normally faster reacting) component 14 and only thereafter with the (normally slower reacting) component 11. By virtue of the presence in this case of the physical separator 12, the component 11 is consumed only slowly because of the limited interface area between the component and the water.

Figure 2:
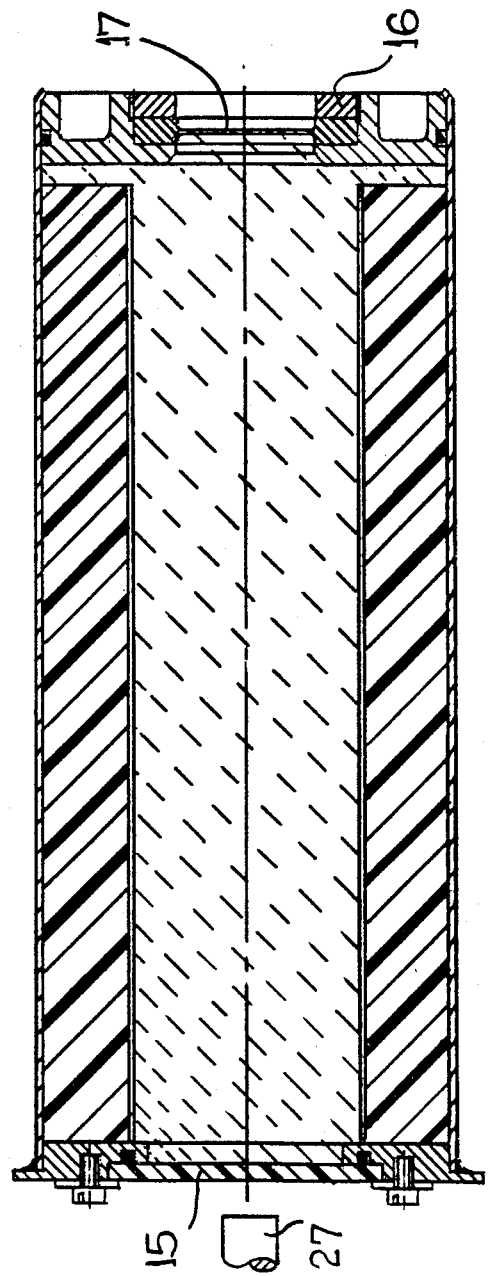
FIG. 2 is a sectional view through a second device of the invention.

Turning to FIG. 2, there is shown a similar type of device to that of FIG. 1. However, the spool valve arrangement of FIG. 1 is replaced by a glass disc 15 which can be broken by causing a suitable object 27 to strike it and by a bursting disc 16 at the opposite end of the device whose element 17 is of predetermined strength to rupture at a given underwater pressure. In all other respects, the device operates in a manner similar to that of FIG. 1.

Figure 3:
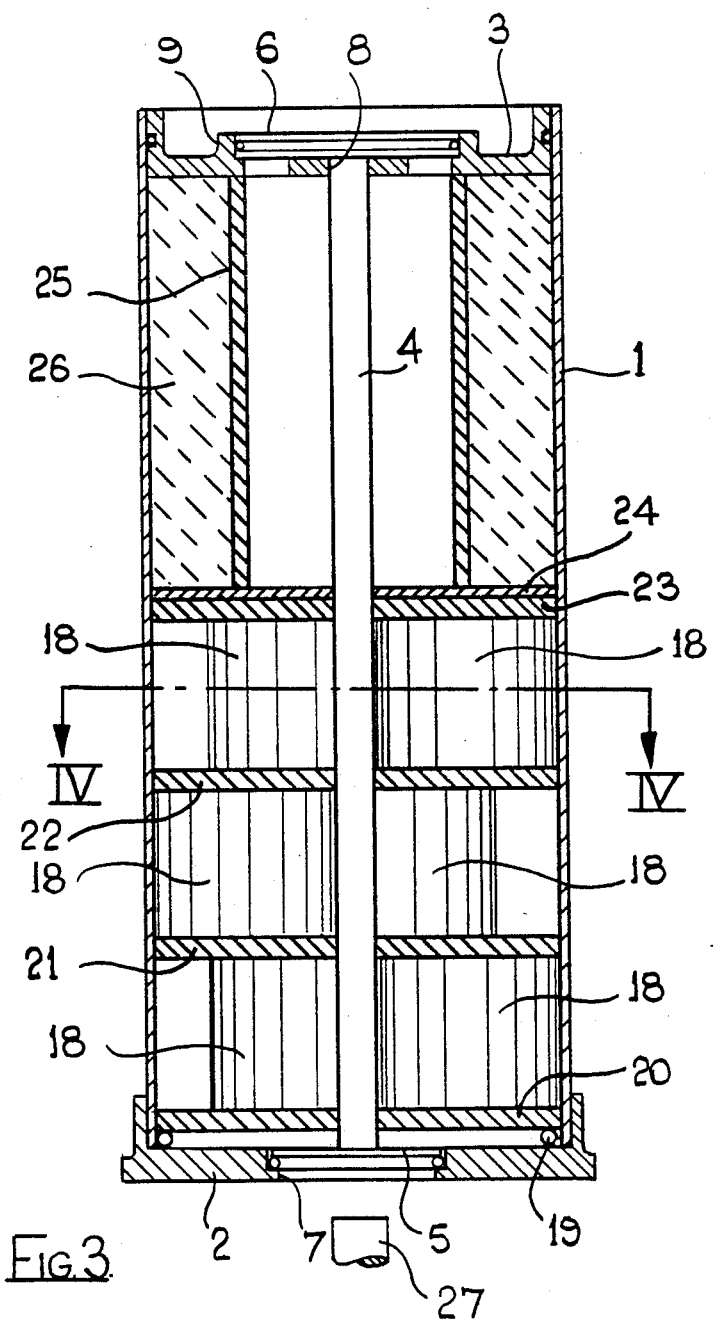
FIG. 3 is a sectional view through a third device of the invention.
Figure 4:
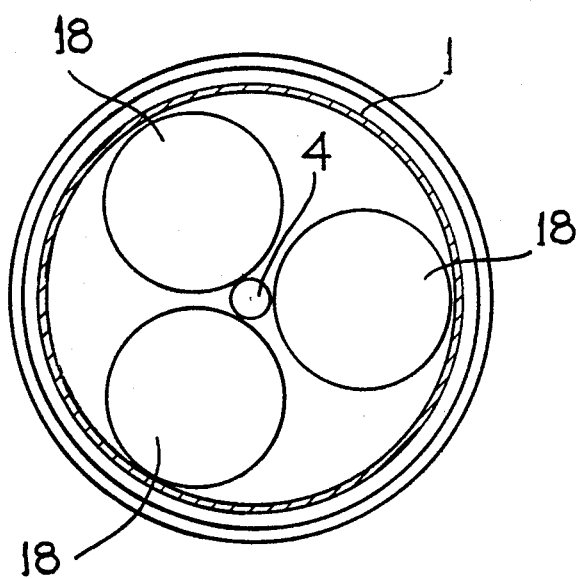
FIG. 4 is a sectional view through the device of FIG. 3 along the line IV—IV.

With regard to FIGS. 3 and 4, there is shown a similar type of device to that of FIG. 1 with the generator having a plurality of components to provide a varied rate of gas generation.

In particular, the device of FIGS. 3 and 4 possesses, in addition to the parts common to the device of FIG. 1, three sets of three individual generator components 18 in the form of cylinders whose diameter approximately equals the internal radius of the container 1. The cylindrical components 18 can therefore be positioned about the stem 4 in the manner shown in FIG. 4. Packing of the container 1 with the cylindrical components 18 is achieved by providing a spacer ring 19 on which is placed a water permeable spacer in the form of a mesh disc 20. Three components 18 are then placed in this disc 20 in the manner shown in FIG. 4 and further discs 21, 22 and two further sets of three components 18 are added. A final disc 23 and then a disc 24 of gauze are then provided to complete the first "charge" of generator composition.

Each cylindrical component 18 is encapsulated in copper foil except for the upper (flat) surface thereof so that, in use, water penetrating through the aperture 7 and passing between the components 18 and the mesh discs 20, 21, 22 and 23 contacts the generator substance only at the exposed upper surface of each cylinder, thereby providing a substantially constant surface area of contact between the generator substance and the water and thus providing a substantially constant rate of gas evolution.

The upper volume of the container above the gauze disc 24 contains a separate generator "charge" held between the disc 24 and a gauze cylinder 25 positioned about the stem 4. This upper charge 26 will generally provide a greater rate of gas evolution than the first charge and may conveniently comprise pure lithium hydride granules of predetermined grain size.

In use, therefore, the generator device shown in FIGS. 3 and 4 can provide differential rates of gas evolution, the rate of evolution from each charge may of course be varied by one or more of the selection of grain size of the active generator composition in particular, by the compaction pressure and density of the cylindrical component, by the presence of waxes and other additives and by encapsulation of one or more surfaces.

Furthermore, the generator devices of the invention may possess more than two "charges", i.e. there may be a plurality of separate charges depending on the use to which the devices are to be put.

We claim:

1. A gas generating device comprising a container having a pair of opposed walls each formed with an opening; a closure assembly comprising a pair of closure members each in sealing watertight engagement with a respective one of the openings and each being movable to break said sealing engagement, and a rod extending between and movable with the closure members; a water-reactive substance stored within the container; and trigger means provided to operate the closure assembly by moving the rod so that the sealing engagements of the closure members with their respective openings are broken substantially simultaneously to allow water to penetrate the container through the openings and react with the substance to produce gas that escapes from the container.

2. A device as claimed in claim 1 in which the closure members are discs and said openings are circular.

3. A device as claimed in claim 2 in which the rod is coaxial with the discs.

4. A device as claimed in claim 2 in which each of said closure members engages against a seat around the periphery of a respective opening.

5. A device as claimed in claim 4, further comprising lock means urging a said closure member into sealing watertight engagement with its associated said opening.

6. A device as claimed in claim 4 in which the lock means is forcibly overridden when the closure member is operated and then acts to prevent the closure members from being sealingly re-engaged with their respective seats.

7. A device as claimed in claim 6 in which the lock means comprises spring means.

8. A device as claimed in claim 4 in which the externally exposed areas of the closure members have areas exposed to external pressure such that external pressure forces acting on said exposed areas balance one another partially and urge the closure members into engagement with their respective seats.

9. A device as claimed in claim 1 in which the container is cylindrical with the openings in its opposed end walls and the closure assembly coaxial with the cylindrical axis of the container.

10. A device as claimed in claim 1 in which the trigger means comprises an explosive-operated bolt.

11. A device as claimed in claim 1 in which the container contains a first substance that reacts rapidly with water and a second substance that reacts more slowly with water.

12. A device as claimed in claim 1 in which the first substance is stored in toroidal form and has a cylindrical surface that is completely exposed to the water.

13. A device as claimed in claim 12 in which the second substance comprises a plurality of compressed pellets that are all exposed simultaneously to water entering the container.

14. A device as claimed in claim 13 in which each pellet has a constant cross-sectional area with only an end thereof exposed to water entering the container.

15. A device as claimed in claim 14 in which the pellets are stored in layers of more than one separated by spacers that allow access of water entering the container to all the pellets.

16. A gas generating device comprising a container having an opening in a wall thereof, a closure member in watertight sealing engagement with the opening, a plurality of pellets of a compressed water-reactive substance stored within the container and trigger means to open the closure member so that the sealing engagement with the opening is broken to allow water to enter the container through the opening and react with all of the pellets simultaneously to produce gas that escapes from the container, the pellets being of the same size and each pellet having a constant cross-sectional area with only an end face thereof exposed to water entering the container so that the pellet is consumed at a constant rate.

17. A device as claimed in claim 16 in which the pellets are stored in layers of more than one separated by spacers that allow access of water entering the container to all the pellets.

18. A gas generating device comprising a cylindrical container with a pair of end walls each formed with a circular opening, a closure assembly comprising a pair of discs each in sealing watertight engagement with a respective one of the circular openings, a rod coaxial with and interconnecting the discs, and a water-reactive substance stored within the container.

19. A device as claimed in claim 18 further comprising trigger means provided externally of the container to operate the closure assembly by moving it axially to move the discs from sealing engagement with the openings and allow the entry of water and escape of gas produced by the reaction of water with the water-reactive substance.

20. A gas generating device comprising a sealed watertight container containing first and second charges of water-reactive material that produces gas when exposed to water, water inlet means that is operable to allow water to enter the container and contact the first and second charges simultaneously, and gas outlet means that is operable to allow the escape of gas from the container, the first charge being more rapidly reactive with water entering the container than the second charge so that it produces gas at a higher rate and is consumed more rapidly than the second charge.

21. A device as claimed in claim 20 in which the second charge comprises a plurality of compressed pellets each with a constant cross-section with only an end face thereof exposed to water entering the container to be reactive.

22. A device as claimed in claim 21 in which the second charge comprises a water-reactive material in granular form and an inert dry binder mixed together and compressed into pellets.

* * * * *